United States Patent
Engelberg et al.

(10) Patent No.: US 12,476,998 B2
(45) Date of Patent: Nov. 18, 2025

(54) AUTOMATED PRIORITIZATION OF CYBER RISK TO DIGITAL IDENTITIES

(71) Applicant: Accenture Global Solutions Limited, Dublin (IE)

(72) Inventors: Gal Engelberg, Pardes-hana (IL); Dan Klein, Rosh Ha'ayin (IL); Moshe Hadad, Rosh HaAyim (IL); Roei Levi, Mevaseret-Zion (IL); Daniel Voicu, Barcelona (ES); Victor Daniel Corvalan, Buenos Aires (AR); Daniel Nahmias, Haifa (IL); Yossef Tahar, Petach-Tikva (IL); Lior Bass, Ramat Gan (IL)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 92 days.

(21) Appl. No.: 18/609,300

(22) Filed: Mar. 19, 2024

(65) Prior Publication Data

US 2024/0430289 A1 Dec. 26, 2024

(30) Foreign Application Priority Data

Jun. 21, 2023 (EP) ..................................... 23382634

(51) Int. Cl.
 *H04L 9/40* (2022.01)
(52) U.S. Cl.
 CPC ................. *H04L 63/1433* (2013.01)
(58) Field of Classification Search
 CPC .. H04L 63/1433; H04L 63/105; H04L 63/083
 See application file for complete search history.

(56) References Cited

U.S. PATENT DOCUMENTS

| | | | |
|---|---|---|---|
| 9,053,335 B2 * | 6/2015 | Sambamurthy | H04L 63/083 |
| 9,992,219 B1 * | 6/2018 | Hamlet | H04L 63/1433 |
| 11,483,335 B1 * | 10/2022 | Tsokos | G06F 18/2415 |
| 11,563,741 B2 * | 1/2023 | Crabtree | H04L 63/1433 |
| 11,743,245 B2 * | 8/2023 | Sherlock | H04L 63/105 |
| | | | 726/4 |
| 2020/0396218 A1 * | 12/2020 | Crabtree | H04L 63/0876 |

(Continued)

FOREIGN PATENT DOCUMENTS

| | | | | |
|---|---|---|---|---|
| CN | 119583219 A | * | 3/2025 | H04L 41/16 |
| WO | WO-2023212380 A1 | * | 11/2023 | G06Q 10/04 |

*Primary Examiner* — Sarah Su

(57) ABSTRACT

Implementations are directed to methods, systems, and apparatus for automated prioritization of cyber risk to digital identities. Actions include obtaining graph data defining a knowledge graph including nodes and edges, the nodes representing respective objects of the enterprise network including digital identities and resources, each node being associated with an explicit risk score and properties of the represented object, each edge representing a relation between objects; determining priority scores for the objects, including, for a first object represented by a first node: determining an implicit risk score for the first node; determining a total risk score for the first node; and determining a priority score for the first node based on the total risk score and properties associated with the first node; generating a ranking of the objects according to the priority scores; and providing, for presentation on a display, cyber security risk data indicating the ranking of the objects.

20 Claims, 8 Drawing Sheets

(56) References Cited

U.S. PATENT DOCUMENTS

| | | | | |
|---|---|---|---|---|
| 2020/0410001 | A1* | 12/2020 | Sarkissian | G06F 3/0482 |
| 2022/0131870 | A1* | 4/2022 | Mckinnon | H04L 63/105 |
| 2022/0191230 | A1* | 6/2022 | Morgan | H04L 63/20 |
| 2022/0263855 | A1* | 8/2022 | Engelberg | H04L 63/1433 |
| 2023/0076372 | A1* | 3/2023 | Engelberg | G06F 21/577 |
| 2023/0328094 | A1* | 10/2023 | Brown | H04L 63/1433 726/23 |
| 2023/0328096 | A1* | 10/2023 | Engelberg | H04L 63/1433 726/25 |
| 2024/0267400 | A1* | 8/2024 | Gazit | G06F 21/552 |
| 2025/0030724 | A1* | 1/2025 | Fellows | H04L 41/16 |

\* cited by examiner

AUTOMATED PRIORITIZATION OF CYBER RISK TO DIGITAL IDENTITIES

CROSS-REFERENCE TO RELATED APPLICATION

This application claims priority to European Application No. 23382634.6 filed on Jun. 21, 2023, the disclosure of which is expressly incorporated herein by reference in the entirety.

FIELD

This specification relates to systems for evaluating and mitigating risks in enterprise networks.

BACKGROUND

Networks, such as computer networks, are susceptible to attack by malicious users (e.g., hackers) and other adverse impacts. For example, hackers can infiltrate computer networks in an effort to obtain sensitive information (e.g., user credentials, payment information, address information, social security numbers) and/or to take over control of one or more systems. Computer networks are used to execute processes that support operations of enterprises and/or industrial infrastructures. Enterprises, in general, and industrial infrastructures, in particular, are increasingly connected to external networks such as the Internet. As such, processes that were once isolated from the open Internet network, are now vulnerable to external cyber-attacks. As the frequency and derived impact of these attacks increase, there is a need to prioritize and mitigate risks in order of importance to the operations.

To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel.

In an effort to defend against attacks, knowledge graphs can be generated, which represent relationships between assets and processes within networks. A knowledge graph can be used to understand how a computer network can be hacked and undesirable consequences that can result. Accordingly, knowledge graphs can be described as an important tool in developing anti-hacker defenses. For example, a knowledge graph can be used to identify the most vulnerable components within a computer network, and can be used to evaluate fixes of vulnerabilities that the knowledge graph reveals (e.g., by fixing a limited number of issues, any adversary attack on the computer network, or on certain components in the computer network can be stopped).

SUMMARY

Implementations of the present disclosure are directed to automated prioritization of cyber risk to digital identities. More particularly, implementations of the present disclosure are directed to executing cyber risk propagation and prioritization analytics.

In some examples, implementations of the present disclosure are provided as a process for automated prioritization of cyber risk to digital identities. The disclosure relates to a system for providing a higher-level representation of the total measured risk associated to the digital identities operating in an organization. The disclosed techniques aim to provide system and methods to quantify the total measured risk as a function of explicit risk, implicit risk, and total risk.

Explicit risk is a value that is derived from an aggregate function of all available risk indicators that can be collected from any security system that allows for the generation of telemetry that can be consumed programmatically, which can then be associated to a given digital identity.

Implicit risk is a value that denotes the contextual importance of a given digital identity and acts as a risk modifier. Implicit risk is a function of a criticality level of resources and a hierarchical level of a digital identity. The criticality level dictates the potential blast radius of any compromise to the security of a resource to which a given digital identity has been granted access. The hierarchical level dictates a digital identity's level of access to resources as well as the potential for a digital identity to grant additional levels of access to itself and other identities. The hierarchical level can be associated with organizational roles of a given digital identity.

The disclosed techniques can be implemented to calculate propagation of total measured risk inside a given organization. Risk propagation can be calculated from a given digital identity to other digital identities, from a given digital identity to the resources to which the digital identity has explicit or implicit access, and from resources to digital identities. Cyber security systems can use the measured risks to automatically prioritize and implement security controls.

In some implementations, actions include obtaining graph data defining a knowledge graph including nodes and edges between the nodes, the nodes representing respective objects of the enterprise network including digital identities and resources, each node being associated with an explicit risk score and one or more properties of the represented object, each edge representing a relation between objects; determining priority scores for the objects of the enterprise network, including, for a first object represented by a first node: determining an implicit risk score for the first node by propagating explicit risk scores over edges of the knowledge graph; determining a total risk score for the first node from the explicit risk score of the first node and the implicit risk score of the first node; and determining a priority score for the first node based on the total risk score and one or more properties associated with the first node; generating a ranking of the objects of the enterprise network according to the respective priority scores; and providing, for presentation on a display of a computing device, cyber security risk data indicating the ranking of the objects of the enterprise network.

Other implementations of this aspect include corresponding systems, apparatus, and computer programs, configured to perform the actions of the methods, encoded on computer storage devices.

These and other implementations can each optionally include one or more of the following features: the cyber security risk data includes a list of digital identities and the total risk scores for each of the digital identities; the cyber security risk data includes a list of resources and the total risk scores for each of the resources; the digital identities include human identities; the digital identities include non-human identities; the resources include applications and workstations; the first node represents a digital identity; a second node represents a resource; and an edge between the first node and the second node represents the digital identity having access to the resource; the first node represents a first digital identity; a second node represents a second digital identity; and an edge between the first node and the second node represents that the first digital identity reports to, manages, or works with the second digital identity; the first node represents a first digital identity; a second node represents a group of digital identities; and an edge between the first node and the second node represents that the first digital identity is included in the group of digital identities; the first node represents a group of digital identities; a second node represents a resource; and an edge between the first node and the second node represents the group of digital identities having access to the resource; the explicit risk score represents an expected level of risk for the associated object over a time duration; the actions include generating the knowledge graph from at least one of a group consisting of: organizational data representing an organizational structure of the enterprise; access data representing accesses of digital identities to resources; and event data representing cybersecurity events that have occurred within the enterprise network; the access data includes at least one of a group consisting of: login data representing accesses of digital identities to workstations; and entitlement data representing accesses of digital identities to applications; the one or more properties associated with the first node include an organizational importance factor for the object represented by the first node, the organizational importance factor being determined based on organizational data representing an organizational structure of the enterprise; the one or more properties associated with the first node include a compliance status of the object represented by the first node; the one or more properties associated with the first node include a number of nodes connected to the first node by an edge; the actions include selecting one or more objects of the enterprise network based on the respective priority scores; and performing one or more actions to mitigate the cyber security risk associated with the selected one or more objects; the one or more properties associated with the first node include a historical average total risk score for the first node, the actions including: determining a difference between the total risk score and the historical average total risk score for the first node; and determining the priority score for the first node based at least in part on the difference between the total risk score and the historical average total risk score.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
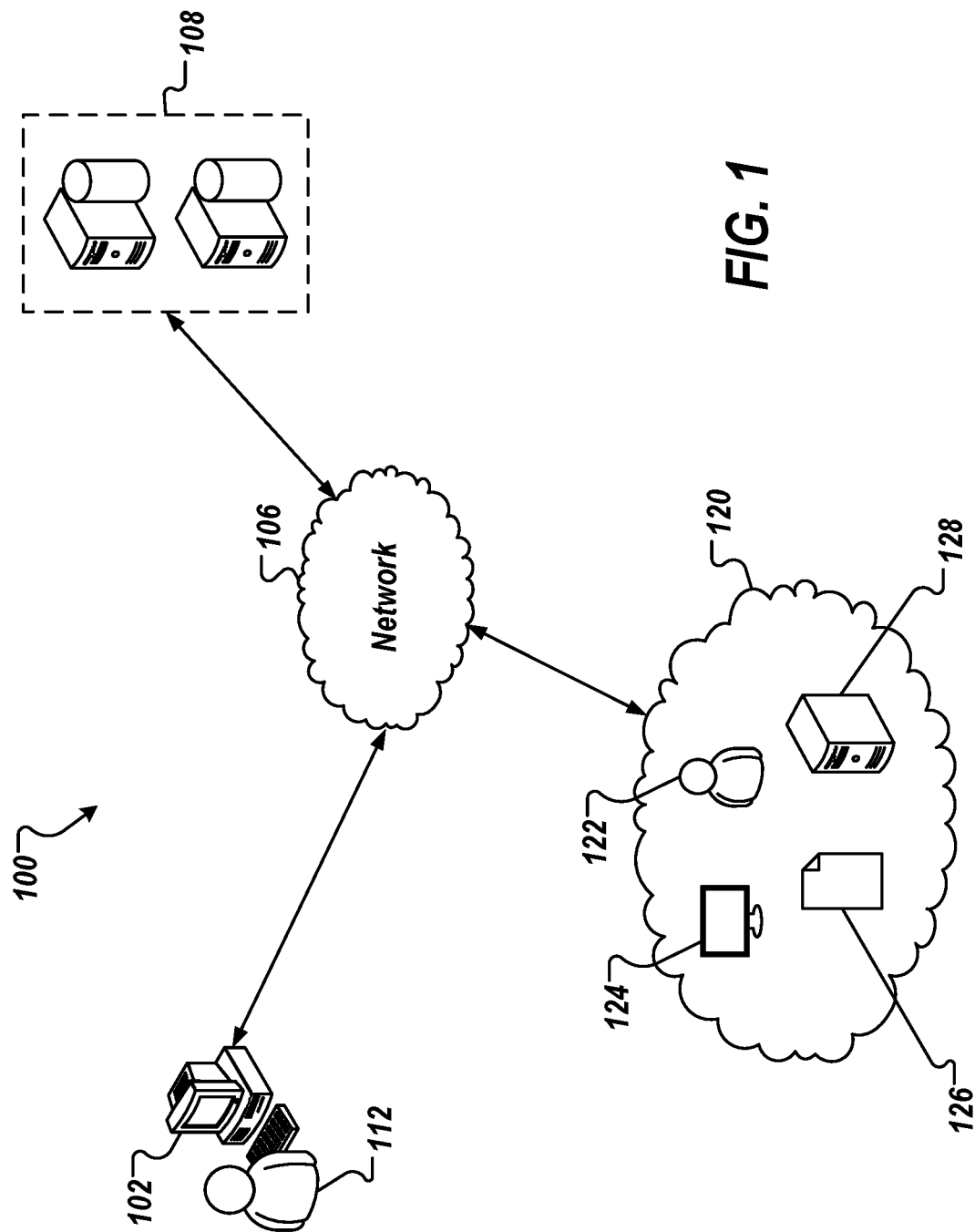
FIG. 1 depicts an example architecture that can be used to execute implementations of the present disclosure.

Implementations of the present disclosure are directed to automated prioritization of cyber risk to digital identities. More particularly, implementations of the present disclosure are directed to executing cyber risk propagation and prioritization analytics.

In some examples, implementations of the present disclosure are provided as a process for automated prioritization of cyber risk to digital identities. The disclosure relates to a system for providing a higher-level representation of the total measured risk associated to the digital identities operating in an organization. The disclosed techniques aim to provide system and methods to quantify the total measured risk as a function of explicit risk, implicit risk, and total risk.

Explicit risk is a value that is derived from an aggregate function of all available risk indicators that can be collected from any security system that allows for the generation of telemetry that can be consumed programmatically, which can then be associated to a given digital identity.

Implicit risk is a value that denotes the contextual importance of a given digital identity and acts as a risk modifier. Implicit risk is a function of a criticality level of resources and a hierarchical level of a digital identity. The criticality level dictates the potential blast radius of any compromise to the security of a resource to which a given digital identity has been granted access. The hierarchical level dictates a digital identity's level of access to resources as well as the potential for a digital identity to grant additional levels of access to itself and other identities. The hierarchical level can be associated with organizational roles of a given digital identity.

The disclosed techniques can be implemented to calculate propagation of total measured risk inside a given organization. Risk propagation can be calculated from a given digital identity to other digital identities, from a given digital identity to the resources to which the digital identity has explicit or implicit access, and from resources to digital identities. Cyber security systems can use the measured risks to automatically prioritize and implement security controls.

In general, to evaluate risk propagation, the explicit risk component of an object is quantified. The object can be a virtual object or a physical object. The object can be, for example, a digital identity, an asset, or a resource of a network. Risk propagation is then calculated from identities to resources and from resources to identities in a way that uncovers the implicit risk of an object to be compromised.

Contextual information is used for ranking objects according to their respective risk. The contextual information includes, for example, organizational importance, compliance status, entitlement type.

To provide context for implementations of the present disclosure, and as introduced above, computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. Computer networks are used to execute processes that support operations of enterprises and/or industrial infrastructures. Enterprises, in general, and industrial infrastructures, in particular, are increasingly connected to external networks such as the Internet. As such, processes that were once isolated from the open Internet network, are now vulnerable to external cyber-attacks. As the frequency and derived impact of these attacks increase, there is a need to prioritize and mitigate risks in order of importance to the operations.

In an effort to defend against cyber-attacks, knowledge graphs can be generated, which represent potential lateral movements of adversaries within computer networks. A knowledge graph can be used to understand how a computer network can be hacked and undesirable consequences that can result. Accordingly, knowledge graphs can be described as an important tool in developing anti-hacker defenses. For example, a knowledge graph can be used to identify the most vulnerable components within a computer network, and can be used to evaluate fixes of vulnerabilities that the knowledge graph reveals (e.g., by fixing a limited number of issues, any adversary attack on the computer network, or on certain components in the computer network can be stopped). While much research has been dedicated to the analysis of a single knowledge graph, little focus has been given to the analysis and comparison of multiple knowledge graphs. In comparing multiple knowledge graphs, the difference between the knowledge graphs is a target of interest, as differences can reveal vulnerabilities that were added, were removed or that persisted across all knowledge graphs.

In view of the above context, implementations of the present disclosure are directed to prioritizing remedial actions for cyber security. More particularly, implementations of the present disclosure are directed to automated process-aware recommendation of remedial actions to mitigate cyber security. As described in further detail, prioritization of remedial actions can include determining a risk assessment based on a knowledge graph, and generating a prioritized list of remedial actions based on the risk assessment and a risk tolerance profile, the prioritized list of remedial actions being generated by a mitigation simulator.

In some examples, automated prioritization of remedial actions of the present disclosure can be realized within an agile security platform that considers attack complexity within an interconnected cyber infrastructure with a variety of attack paths to comprehensively address real attack scenarios. It is contemplated, however, that implementations of the present disclosure of the present disclosure can be realized in any appropriate cyber security platform.

In general, the agile security platform provides a cyber-threat analysis framework based on characterizing adversarial behavior in a multi-stage cyber-attack process. As described in further detail herein, how a threat proceeds within a network is investigated using a knowledge graph and all possible attack stages are identified. In some implementations, each stage can be associated with network attributes. Using a holistic view of threat exposure provided by knowledge graphs, attack techniques and tactics are incorporated into stepping stones found in knowledge graphs.

In further detail, the cyber-threat analysis framework adds context to each attack stage using a real-world knowledge base of adversary tactics and techniques to more comprehensively characterize progression along the attack path. In some implementations, an attack path analysis model identifies a level of difficulty in taking a path by considering the complexity of the path, the skill set of the attacker, and the like. Implementations of the present disclosure provide a path hardness that is measured in terms of a capability of the attacker and challenges. The insight into the level of difficulty of an attack path in the network helps security administrators to pinpoint critical paths and prioritize path hardening actions.

As described herein, the agile security platform enables continuous cyber and enterprise-operations alignment controlled by risk management. The agile security platform improves decision-making by helping enterprises to prioritize security actions that are most critical to their operations. In some examples, the agile security platform combines methodologies from agile software development lifecycle, IT management, development operations (DevOps), and analytics that use artificial intelligence (AI). In some examples, agile security automation bots continuously analyze attack probability, predict impact, and recommend prioritized actions for cyber risk reduction. In some examples, agile security systems automatically implement actions for cyber risk reduction. In this manner, the agile security platform enables enterprises to increase operational efficiency and availability, maximize existing cyber security resources, reduce additional cyber security costs, and grow organizational cyber resilience.

As described in further detail herein, the agile security platform provides for discovery of information technology/operational technology (IT/OT) supporting elements within an enterprise, which elements can be referred to as configuration items (CI). Further, the agile security platform can determine how these CIs are connected to provide a CI network topology. In some examples, the CIs are mapped to processes and services of the enterprise, to determine which CIs support which services, and at what stage of an operations process. In this manner, a services CI topology is provided.

In some implementations, the specific vulnerabilities and improper configurations of each CI are determined and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. The network 106 can include network devices such as switches, routers, firewalls, operational and security appliances (both physical and virtual), WiFi systems etc. that form the logical local area network (LAN) and wide area network (WAN). The components of the network 106 are event data sources that generate event data. The client device 102 can contain software packages and agents, for both operational, functional and security purposes that generate event data that can be used to generate knowledge graphs. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provide such services to any number of client devices (e.g., the client device 102 over the network 106). In accordance with implementations of the present disclosure, and as noted above, the server system 108 can host an agile security platform. The server system 108 can contain software packages and agents, for both operational, functional and security purposes that generate event data that can be used to generate knowledge graphs.

In the example of FIG. 1, an enterprise network 120 is depicted. The enterprise network 120 represents a network implemented by an enterprise to perform its operations. In some examples, the enterprise network 120 represents on-premises systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128. The enterprise network 120 can also contain IoT devices, printers, physical and logical access control systems, physical and logical sensors, physical and logical segmentation. The enterprise network 120 can generate event data that can be used to generate knowledge graphs.

In some implementations, the agile security platform is hosted within the server system 108, and monitors and acts on the enterprise network 120, as described herein. More particularly, and as described in further detail herein, one or more knowledge graphs representative of the enterprise network are generated in accordance with implementations of the present disclosure. For example, the agile security platform detects IT/OT assets and generates an asset inventory and network maps, as well as processing network information to discover vulnerabilities in the enterprise network 120. The agile security platform executes automated prioritization of remedial actions of the present disclosure based on the network information.

In some examples, the agile security platform provides one or more dashboards, alerts, notifications and the like to cyber security personnel that enable the cyber security personnel to react to and remediate security relevant events. For example, the user 112 can include a cyber security expert that views and responds to dashboards, alerts, and/or notifications of the agile security platform using the client device 102.

In some examples, the agile security platform operates over multiple phases. Example phases include an asset discovery, anomaly detection, and vulnerability analysis phase, a cyber resilience risk analysis phase, and a cyber resilience risk recommendation phase.

With regard to the asset discovery, anomaly detection, and vulnerability analysis phase, discovering what vulnerabilities exit across the vertical stack and the relevant use cases is imperative to be conducted from the enterprise IT to the control systems. A focus of this phase is to generate the security backlog of issues, and potential remediations.

Rather than managing each technology layer separately, the agile security platform addresses lateral movements across the stack. Through devices, communication channels (e.g., email, transmission control protocol/internet protocol (TCP/IP)), and/or operation systems, vulnerabilities are addressed within the context of a service (e.g., a service that the enterprise offers to customers), and a cyber kill chain to a target in the operation vertical, generating operation disturbance by manipulation of data. The notion of a CI assists in mapping dependencies between IT/OT elements within a configuration management database (CMDB). A so-called security CI (SCI) maps historical security issues of a certain managed security element and is mapped into a security aspect of a digital twin.

As a result, a stack of technologies is defined, and is configured in a plug-in reference architecture (replaceable and extensible) manner. The stack addresses different aspects of monitoring, harvesting, and alerting of information within different aggregations views (dashboards) segmented according to owners and relevant IT and security users. An example view includes a health metric inserted within the dashboard of an enterprise application. In some examples, the health metric indicates the security condition of the underlying service and hence, the reliability of the provided data and information. Similar to risks that can be driven by labor, inventory, or energy, security risk concern can be presented and evaluated in the operations-level, drilled-through for additional transparency of the issue, and can be optimally remediated by allocating investments to automation or to security and IT personal with adequate operations awareness.

With regard to the cyber resilience risk analysis phase, each vulnerability may have several remediations, and each has a cost associated with it, either per internal personnel time, transaction, service, or retainer, as well as the deferred cost of not acting on the issue. A focus of this phase is to enable economical decision-making of security investments, either to be conducted by the IT and security team or directly by automation, and according to risk mitigation budget.

In further detail, observing a single-issue type and its remediations does not reflect the prioritization between multiple vulnerabilities. Traditional systems are based on global risk assessment, yet the context in which the SCI is part of is missing. The overall risk of a process matters differently for each enterprise. As such, remediation would occur according to gradual hardening of a process according to prioritization, driven in importance and responsibility by the enterprise, not by gradual hardening of all devices, for example, in the organization according to policy, without understanding of the impact on separated operational processes. Hardening of a system should be a decision of the enterprise to drive security alignment with the enterprise.

In addition, as the system is changed by gradual enforcement and hardening, new issues are detected and monitored. Hence, making a decision may be not relevant to rising risks as they evolve. Prioritization according to value is the essence of this phase. The value is relative to the changes in the environment, and thus it is variable in time and is recalculated as changes occur. It is a matter of what is important for the next immediate term, according to overall goals, yet considering changes to the environment.

With regard to the cyber resilience risk recommendation phase, a focus is to simplify approved changes and actions by proactive automation. In traditional systems, the action of IT remediation of security issues is either done by the security team (such as awareness and training), by creating a ticket in the IT service system (call for patch managements), and/or by tools that are triggered by security and monitored by IT (automatic deployment of security policies, change of authentication and authorization, self-service access control management, etc.). Some operations can be conducted in a disconnected mode, such as upgrading firmware on an IoT device, in which the operator needs to access the device directly. Either automated or manual, by IT or by security, or by internal or external teams, the entire changes are constantly assessed by the first phase of discovery phase, and re-projected as a metric in a context. Progress tracking of these changes should also occur in a gradual manner, indicating maintenance scheduling on similar operational processes, hence, driving recommendations for frequent actions that can be automated, and serve as candidates to be self-managed by the operations owners and systems users.

In the agile security platform, acting is more than automating complex event processing (CEP) rules on alerts captured in the system logs and similar tools. Acting is started in areas highlighted according to known patterns and changing risks. Pattern detection and classification of events for approved automation processes (allocated transactions budget), are aimed at commoditization of security hardening actions in order to reduce the attention needed for prioritization. As such, a compound backlog and decision phase, can focus further on things that cannot be automated versus those that can. All issues not attended yet are highlighted, those that are handled by automation are indicated as such, and monitored to completion, with a potential additional value of increasing prioritization due to changing risks impact analysis.

The application of graph algorithms to assess the risk spreading level in a system is commonly known as risk propagation. Risk propagation approaches can be used in risk analytics and networks of nodes representing a system, and are aimed at supporting risk identification, quantification, and mitigation activities.

The contribution leverages the combination of an ontology, which supports semantics-based intelligent systems, encoding a set of rules to be used for representing the risk dependencies within a system composed of objects and processes, and a method to calculate the propagation of risk within the represented system.

The approach facilitates the task of propagating risk in real-time or near real-time between resources (e.g., workstations, applications) and digital identities (e.g., human identities and non-human identities). This involves the capability to investigate how an attacker can compromise both the infrastructure assets and the digital identities of an organization. The approach enables users to easily assess risk and, in particular, to easily access the risk propagation output. Visualization support is provided to enable a user to browse and analyze the data. The output can be filtered according to user-input queries.

The approach can support identifying the digital identities and resources that have the highest risk, prioritizing mitigation activities, and suggesting a relevant remediation plan. The approach keeps track of risk propagation over time. For instance, the risk propagation can change after applying a mitigation step. For the same identities and resources, there may be different risk propagation phenomena at different times. The approach allows discovering elements that are at risk even if they are not directly connected. This can happen by considering different types of relations between elements at risk, like organizational relations. The approach enables the propagation of risk when an element is a part of a causal chain.

Risk can be used to quantify the possibility of reaching given objectives, where such a quantity value is derived from the combination of the probability that a certain risk event occurs (as a perturbation of the plan for reaching the objectives) and a set of severity values. For example, an attacker may have read/write access to a database and can damage the database integrity and confidentiality. The read/write access represents the risk event, and the severity values will be associated with the database integrity and confidentiality features.

Risk can be considered an effect of uncertainty on objectives. Risk is a polysemic term, which covers multiple phenomena including risk magnitude, risk assessment, vulnerability, loss and threat events, etc. Risk can be calculated as $R=P*(S1, \ldots, Sn)$, where P provides the probability that a risk event occurs, and each Sj encodes a severity value. The propagation task can start from a given risk value, associated to a given risk event (e.g., damage to a device). The risk associated with the risk event can spread through the elements (e.g., objects and identities) involved, either directly or indirectly.

The disclosed systems provide a standardized intermediate data substrate to enable semantic interoperability between different security systems that handle digital identities, by virtue of providing a single source of truth for total measured risk associated to digital identities. Results could be applied to various implementations, such as vendor-agnostic and context-aware security policies, preemptive counter intrusion measures, and accurate calculation of blast radius in case of a security breach. The disclosed techniques can be used for simulation of security posture for a given organization in a before/after context to analyze potential impact and readiness in order to generate mockups to describe ostensible attack kill-chains. The disclosed systems can consume descriptions of attack kill-chains resulting from documented past security breaches in the organization, in other organizations, or from exercises, in a structured data format.

Figure 2:
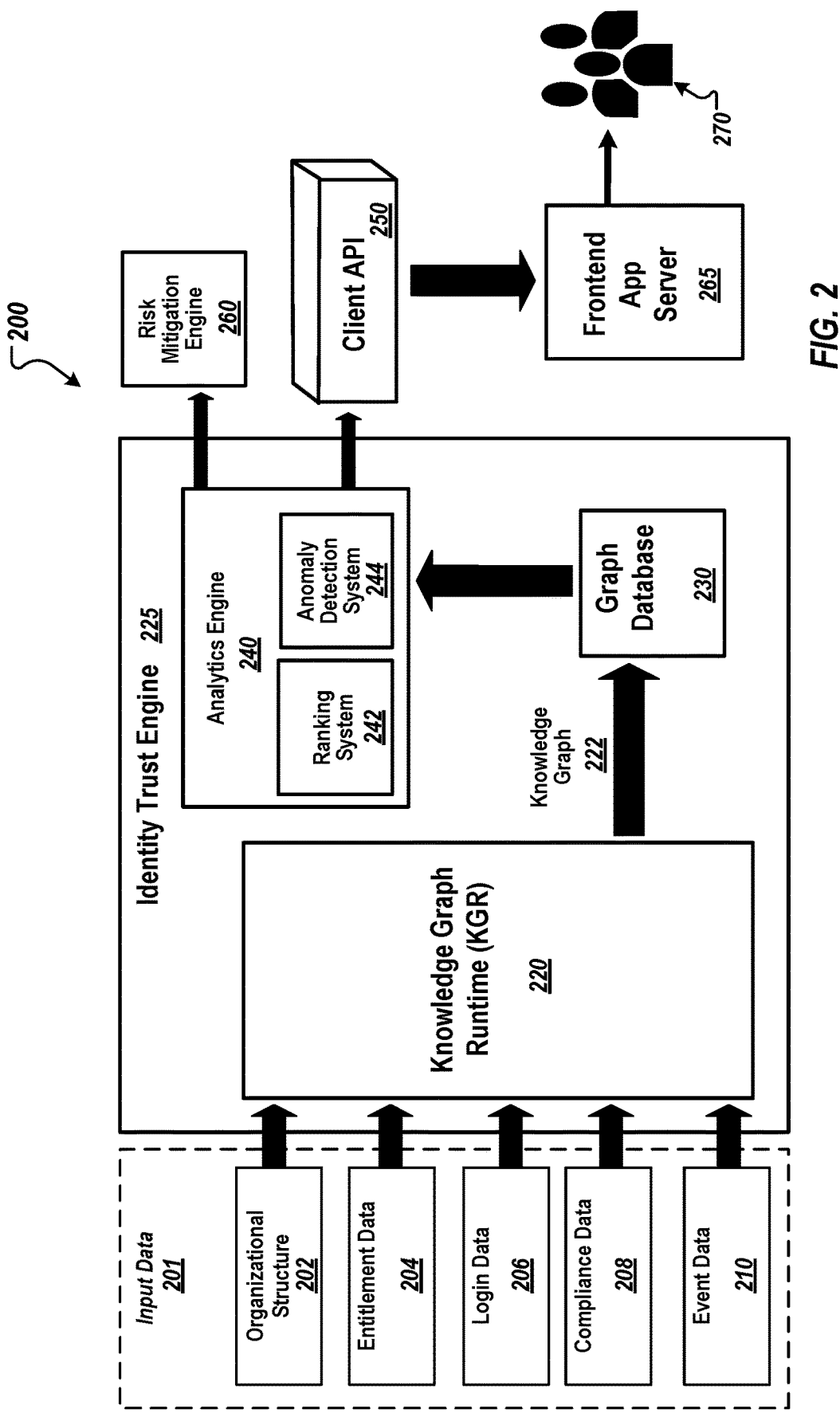
FIG. 2 depicts a conceptual architecture for automated prioritization of cyber risk to digital identities according to implementations of the present disclosure.

FIG. 2 depicts a conceptual architecture 200 for automatically prioritizing corrective actions to hazardous digital identities. The architecture 200 includes an identity trust engine 225. The identity trust engine 225 includes a knowledge graph runtime 220, a graph database 230, and an analytics engine 240. The analytics engine 240 includes a ranking system 242 and an anomaly detection system 244. The knowledge graph runtime 220 and graph database 230 can be deployed on a graph database platform. The analytics engine 240 can be implemented as an application that interacts with the graph database platform.

In general, the identity trust engine 225 receives input data 201. The input data 201 includes organizational data, event data, and asset inventory data. The knowledge graph runtime 220 digests the information represented by the input data 201 into a graphical representation, and stores the graphical representation to the graph database 230. Then, the analytics engine 240 runs various analyses for risk quantification, propagation, and ranking. In some examples, the analysis results can used by the client API 250 to feed a user interface through a frontend application server 265.

In some examples, the analysis results can be provided to a risk mitigation engine 260. The risk mitigation engine 260 can perform automated actions to mitigate the risks identified and prioritized by the identity trust engine 225. Automated actions can include, for example, disabling accounts for digital identities, disabling workstations, revoking entitlements of digital identities to applications, modifying entitlements of digital identities to applications, or any combination thereof. Automated actions can also include updating or patching software, updating applications, updating workstations, fixing compliance issues with workstations, or any combination thereof. Actions can include: logical quarantine of workstations, servers and other physical and virtual system, enhanced monitoring of systems to confirm if compromised, deployment of deception technologies like honeypots and breadcrumbs to misdirect and study attackers and their patterns, self-destruct of data and virtual systems that are deemed compromised.

The input data includes an organizational structure 202 representing relations within the organization. For example, the organizational structure 202 includes identifications of managers and their direct reports. The organizational structure 202 can indicate which individuals of an organization report to which other individuals. The organizational structure 202 can be obtained from the organization's directory or a similar collector. An organization, or enterprise, could be any form of well-defined aggregate purposive human entity in which individuals are granted access to resources inside their respective computer networks by means of unique identifiers. Organizations could be composed of respective sub-organizations, meaning individuals grouped in the same logical containers, by virtue of sharing the same roles and/or assigned tasks.

The input data 201 includes entitlement data 204 representing entitlement of digital identities to applications. For example, the entitlement data 204 can include lists of digital identities that have access to various applications. The entitlement data 204 can also indicate types of accesses of digital identities to applications. For example, the entitlement data 204 can specify access levels of digital identities to applications. The entitlement data 204 can be obtained from the organization's access provisioning system, or a similar collector.

The input data 201 includes login data 206 representing mappings of digital identities to login information for workstations. For example, the login data 206 can include lists of digital identities that have access to various workstations. The login data 206 can also indicate types of accesses of digital identities to workstations. The login data 206 can include mappings between digital identities and resources. The login data 206 can be obtained from the organization's security information and event management system, or a similar collector.

The input data 201 includes compliance data 208 representing compliances statuses of workstations, servers, network devices, applications and any other physical and logical system in the IT and OT stack. The compliance data 208 can be obtained from the organization's compliance tools, or a similar collector.

The input data 201 includes event data 210 representing cybersecurity events. The event data 210 can be obtained from the organization's security information and event management system, or a similar collector. Each event can be associated with an explicit risk score. The explicit risk score can indicate a likelihood of the event occurring and a severity of the event.

The knowledge graph runtime (KGR) 220 accepts the input data 201 and forms the input data 201 in the structure of a graph (e.g., knowledge graph 222). In some examples, the input data 201 is provided in a standard data structure. The KGR 220 automatically processes the input data 201 to generate the knowledge graph 222 by running mapping scripts over the input data 201. The input data 201 is thereby mapped to nodes and edges of the knowledge graph 222. The knowledge graph 222 constructed by the KRG 220 is saved into the graph database 230. The graph database 230 can be, for example, a Neo4J graph database. An example schema for the knowledge graph 222 is provided in FIG. 3.

The analytics engine 240 runs the analytics on the persisted knowledge graph 222 created by the KGR 220. The analytics engine 240 takes a raw representation of the knowledge graph 222 for a given timeframe, and applies ranking and anomaly detection algorithms accordingly.

The analytics engine 240 includes the ranking system 242. The ranking system 242 prioritizes objects at risk according to the implicit risk over the object, and according to properties of the object. The properties of the object can include an organizational importance, a compliance status, a number of related objects, or any combination of these. The ranking is performed based on contextual information provided in the input data 201 and based on risk propagation over the knowledge graph 222. Example ranking processes are described with reference to FIGS. 4A to 4D.

The analytics engine 240 includes the anomaly detection system 244. The anomaly detection system 244 detects anomalies in a dataset of periodically added risks for different identities. This can be implemented to identify unusual or unexpected behavior from individual users, which could be indicative of fraudulent activity, security breaches, or other issues that could negatively impact the organization. By calculating anomaly scores for each identity based on their historical data and comparing them to personal and global thresholds, organizations can potentially detect and address problematic behavior before it causes significant harm. This approach is complementary to the ranking systems and can be used to discover risk that would otherwise go undetected. Example anomaly detection processes are described with reference to Table 1.

Output of the identity trust engine 225 can be presented to users 270, for example, by presenting the output in a user interface on a display of a computing device. Example outputs and user interfaces are described with reference to FIGS. 5A and 5B.

The graph analysis performed by the analytics engine 240, and the response performed by the risk mitigation engine, can be performed in real-time or near real-time. For example, the analytics engine 240 can continuously or continually analyze the knowledge graph 222 to rank identities according to their respective risk and detect anomalies, in order to provide a timely response to a cyber risk. The knowledge graph runtime 230 can continuously update the knowledge graph 222 based on new input data 201 received from the data sources. Relationships between the nodes of the knowledge graph 222 and the total risk can be continuously recalculated based on the real-time input data 201. Thus, analysis results and actions that are taken by the risk mitigation engine 260 are based on the most recent available information.

Figure 3:
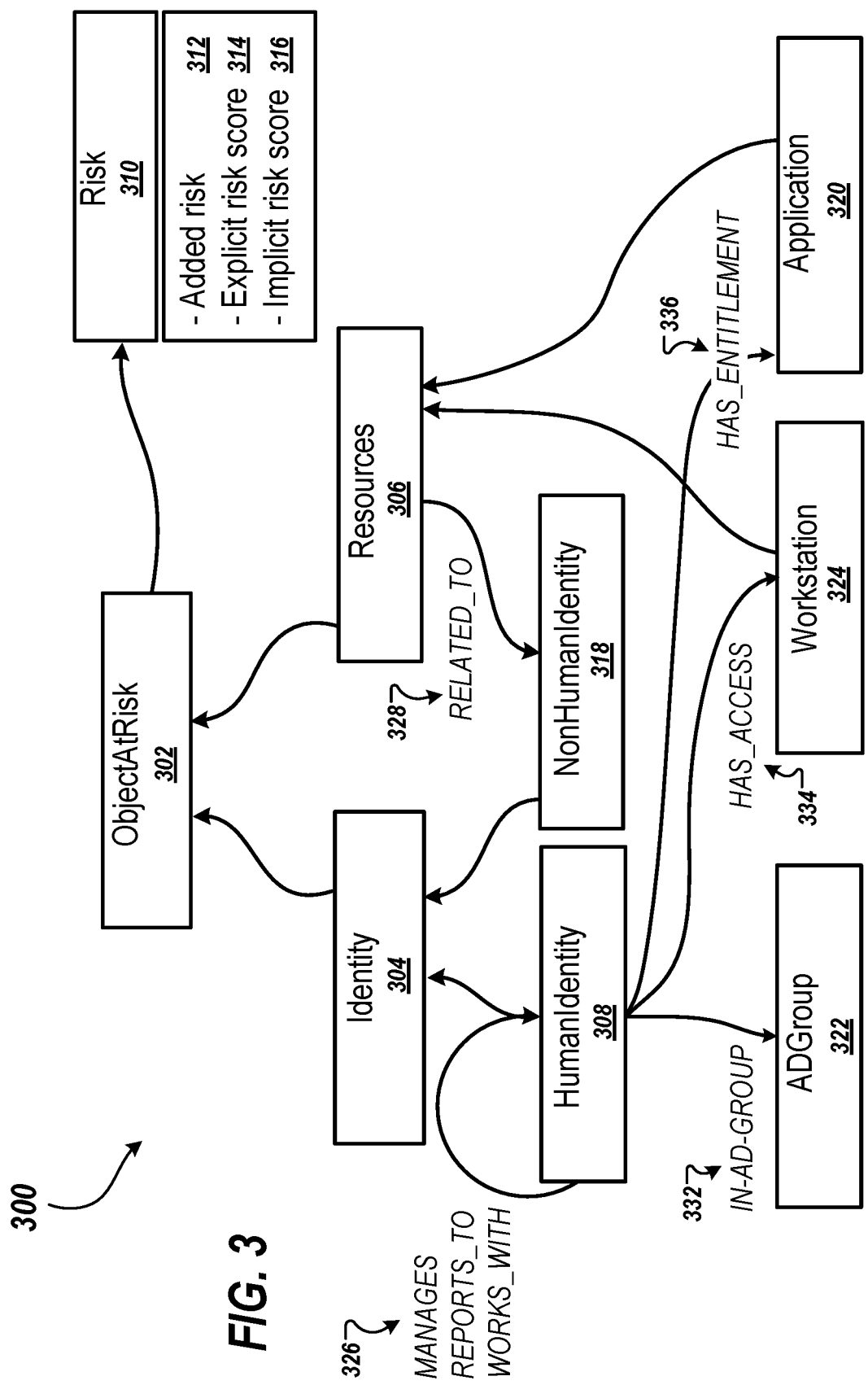
FIG. 3 is a graph schema of a knowledge graph according to implementations of the present disclosure.

FIG. 3 is representation of identity trust engine graph schema 300. The graph schema 300 defines a data model for managing and accessing risks associated with workstations, applications, resources, and identities in an organizational environment. The model includes several classes such as Workstation, Application, Identity, ObjectAtRisk, and Risk, each with its own set of properties. The properties describe various aspects of the corresponding class, such as its country, corporate structure, image version, serial number, overall compliance, explicit risk scores, and implicit risk scores. The ObjectAtRisk class 302 represents a superclass for resource (e.g., workstations, applications), and identities, indicating that these classes are all subject to potential risk.

The schema 300 includes an identity class 304 including a human identity class 308 and a non-human identity class 318. A non-human identity can be, for example, a cloud identity (e.g., AWS IAM user, AWS IAM role, AWS Service Role, Azure Service Principles). Applications, functions, containers, and servers can assume these roles and become associated with the identities. Humans can also activate roles with just-in-time access, when they are not active the association is not in force. Non-human identities can also be "Service Accounts," "AppIDs," or other identities in a directory (Active Director, Azure Active Directory, Vaults). These non-human identities can be associated with resources such as applications/code, functions, containers, and servers for system-to-system communications. Non-human identities can also be local accounts on systems such as servers, workstations, software builds, and SaaS. In some examples, a non-human identity can have a RELATED_TO relation 328 with one or more resources 306, such as workstations and applications.

Various types of relations 326 can exist between human identities. The relations 326 can include a REPORTS_TO relation, indicating that an employee reports to a manager. The relations 326 can include a MANAGES relation, indicating that a manger manages an employee. The relations 326 can include a WORKS_WITH relation, indicating that two employees work together under a management of the same identity. The WORKS_WITH relation is an inferred relation between multiple identities that have a REPORTS_TO relation with the same identity. In the knowledge graph 222, identities can be represented as nodes, and relations between the human identities can be represented as edges between the nodes.

The schema 300 includes a resources class 306 including a workstation class 324 and an application class 320. Various types of relations can exist between identities and resources. The relations can include a HAS_ENTITLEMENT relation 336, indicating that the identity has access to an application. The relations can include a HAS_ACCESS relation 334, indicating that the identity has access to a workstation.

The schema 300 includes an ADGroup class 322 representing administrative groups of workstations. Identities can have an IN_AD_GROUP relation 332 with an ADGroup 322. The IN_AD_GROUP relation 332 is an inferred relation between an identity and an administrative group of the workstations to which the identity has access.

The Risk class 310 represents an observation of risk with regards to the ObjectAtRisk 302. A new risk node is created when a new observation of periodically added risk (e.g., daily aggregated risk) is introduced. The explicit risk score 314 of objects represents the risk quantification summarization for a time interval as measured by the cyber event collector (e.g., security information and event management). The implicit risk 316 represents the risk propagation results.

The added risk 312 represents the periodically added explicit risk. The added risk 312 is associated to all events that triggered the added risk. These events can be captured in a non-graphical database. Example of events that can cause added risk include event data such as malware detected on workstation or server, user behavior such as clicking on malicious URLs, IT systems communicating over the network with destinations known to be controlled by attackers (hackers); suspected changes in entitlement data such as identities receiving a large and atypical amount of privileges; changes in compliance status, such as open critical vulnerabilities or sudden disablement of key security controls; suspected changes in the organizational structure such as the same identity being elevated to manage multiple critical groups; suspected login information such as "impossible travel", many unsuccessful login attempts, attempts to abuse the multi-factor authentication systems. The resulting knowledge graph is temporal, where every risk node is associated with a timeframe where the risk observation is valid.

The schema 300 can be used to propagate risk across a network. Implicit risk is risk that is propagated from one node of a knowledge graph to another due to relations between the nodes. In an example, a node in a knowledge graph represents a first human identity with no explicit risk. The first human identity has a HAS_ENTITLEMENT relation with a first application, such that the first human identity can edit content of the first application. The first human identity has a HAS_ACCESS relation with a first workstation. The first workstation has a vulnerability, and therefore has some explicit risk. Due to the vulnerability of the first workstation, the first human identity is at risk of being compromised. Therefore, although the first human identity has no explicit risk, the first human identity does have implicit risk due to the relation with the first workstation. The implicit risk is the explicit risk propagated from the first workstation to the first human identity. Due to the HAS_ENTITLEMENT relation between the first human identity and the first application, the first application is also at risk of being compromised. Thus, risk propagates from the first workstation to the first human identity to the first application. The first application therefore also has an implicit risk that is the result of risk propagating from the first workstation.

In the above example, risk propagation and object ranking can be performed to rank the identities and resources based on the associated total risks, where the total risk of an object is the maximal of the explicit risk and the implicit risk. For example, when the explicit risk of an object is greater than the implicit risk, the total risk can be determined to be equal to the explicit risk. When the implicit risk of an object is greater than the explicit risk, the total risk can be determined to be equal to the implicit risk. Processes for propagating risk and ranking objects are described with reference to FIGS. 4A to 4D.

Based on the rankings, automated actions can be performed to reduce the risks to identities and resources, thereby reducing the overall risk to the network. For example, in the above example, an automated action can be performed to reduce or eliminate the vulnerability of the first workstation. The automated action can include performing a software update to the first workstation. Instead of or in addition to reducing or eliminating the vulnerability of the first workstation, risk can be reduced by automatically revoking the access of the first human identity to the first workstation. By revoking the access to the first workstation, the explicit risk of the first workstation can be prevented from propagating to the first human identity, thus reducing the overall risk to the network.

Figure 4B:
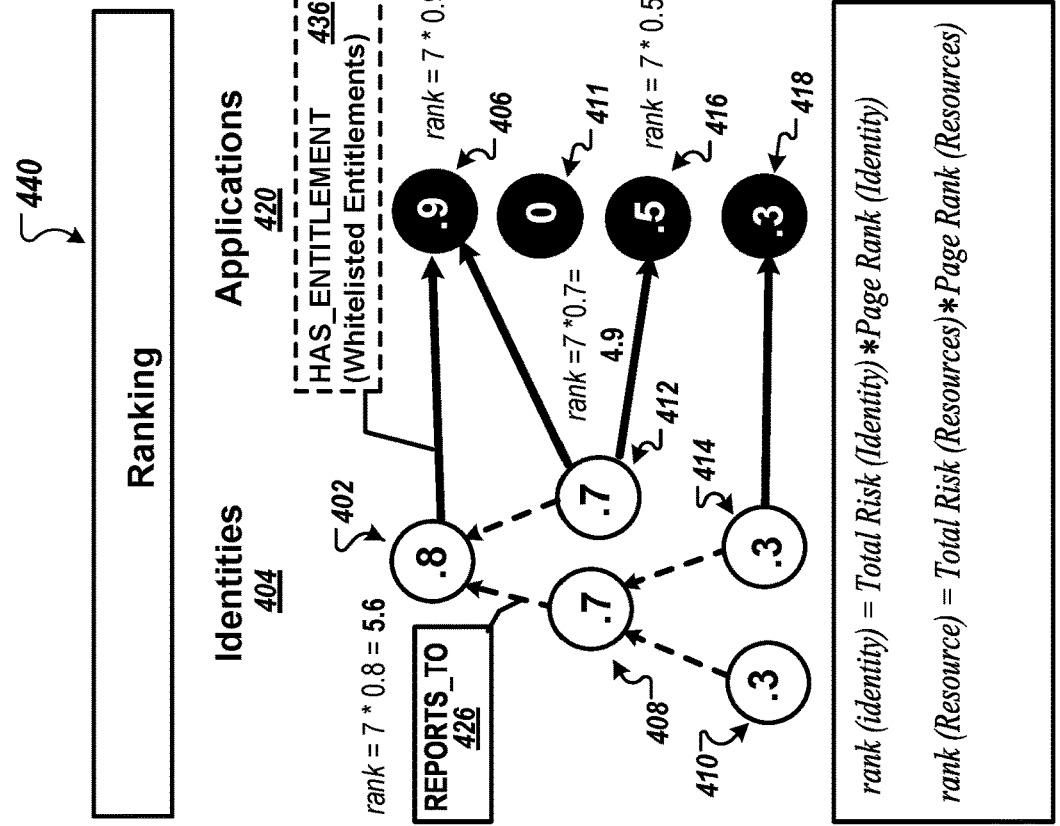
FIGS. 4A to 4D depict examples of risk propagation and identity ranking.
Figure 4A:
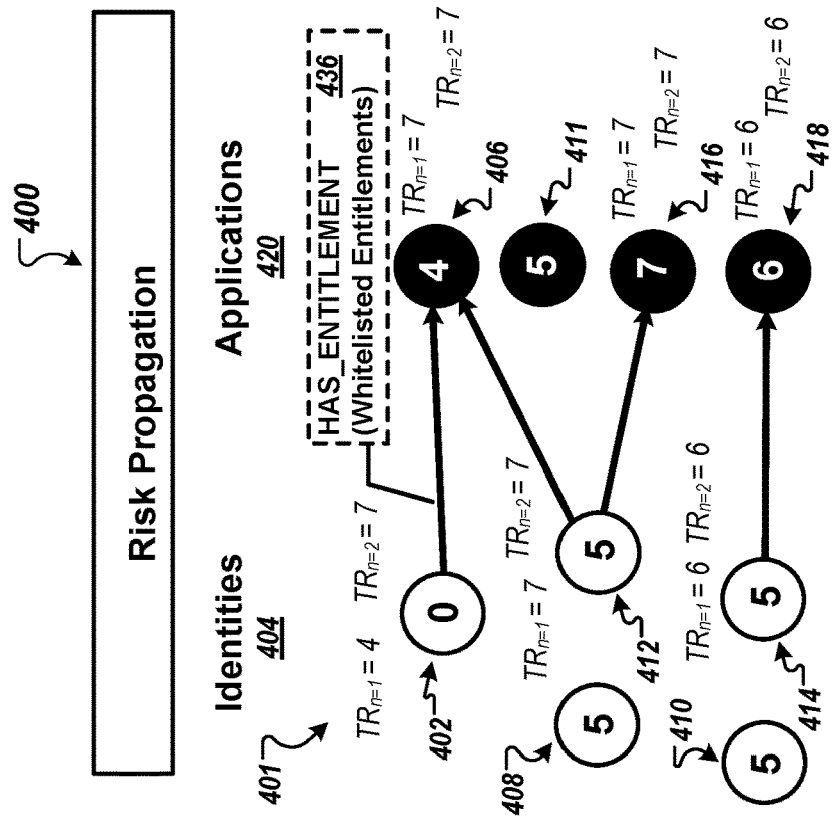

FIGS. 4A to 4D depict examples of risk propagation and identity ranking. FIG. 4A illustrates a risk propagation step 400 applied to a subgraph 401 of an example knowledge graph. Risk propagation can be performed by the analytics engine 240 of the identity trust engine 225.

The subgraph 401 includes nodes representing identities 404 (identity nodes 402, 408, 410, 412, 414). The subgraph 401 includes nodes representing applications 420 (resource nodes 406, 411, 416, 418). Edges of the subgraph 401, shown as solid arrows, represent relations between the identity nodes and the resource nodes. Specifically, the edges of the subgraph 401 represent HAS_ENTITLEMENT relations 436 between identities and resources.

To perform risk propagation, risk is propagated through the subgraph 401 between identities 404 and resources (e.g., applications 420) via the HAS_ENTITLEMENT relations 436. Risk propagation is performed iteratively, until reaching a pre-defined number of iterations, or reaching a state where the overall risk in the graph converges. At each iteration, the identity risk nodes are updated, and then the resources risk nodes are updated. A risk over an object is updated according to the maximal risk of its neighbor objects if their entitlement is in a pre-defined whitelist. Thus, the total risk is calculated for each node, where total risk is the maximum of explicit risk (ER) (e.g., direct risk) and implicit risk (IR) (e.g., indirect risk).

Referring to FIG. 4A, identity node 402 has a direct risk of zero, identity node 412 has a direct risk of five, and identity node 414 has a direct risk of five. Identity node 402 has a relation with resource node 406, identity node 412 has a relation with resource nodes 406 and 416, and identity node 414 has a relation with resource node 418. The resource node 406 has a direct risk of four, the resource node 416 has a direct risk of seven, and the resource node 418 has a direct risk of six.

In a first iteration (n=1), identity nodes are updated first, such that risk propagates from the resource node 406 to the identity node 402, from the resource node 416 to the identity node 412, and from the resource node 418 to the identity node 414. Therefore, after the identity node update of the first iteration, the total risk of the identity node 402 is four, the total risk of the identity node 412 is seven, and the total risk of the identity node 414 is six. Still in the first iteration, resource nodes are updated second, such that risk propagates from the identity node 412 to the resource node 406. Therefore, after the resource node update of the first iteration, the total risk of the resource node 406 is seven, while the total risk of the identity node 402 remains at four.

In a second iteration (n=2), identity nodes are again updated first, such that risk propagates from the resource node 406 to the identity node 402. Therefore, after the identity node update of the second iteration, the total risk of the identity node 402 is seven. In the second iteration, resource nodes are updated second, such that risk propagates from the identity nodes to the resource nodes. In the example subgraph 401, the graph converges at the second iteration, since all nodes are at the maximal of the direct risk and the indirect risk of its neighbors. In some examples, the analytics engine 240 ceases performing risk propagation when the graph converges. In some examples, the analytics engine 240 continues to perform risk propagation until a designated number of iterations are performed.

FIG. 4B illustrates a ranking step 440 applied to the subgraph 401. Ranking can be performed by the ranking system 242 of the analytics engine 240. During ranking processes, identities are ranked according to their organizational importance and according to their total risk. For example, a digital identity of an executive of an organization can be prioritized above a digital identity of a low-level employee of the organization, given the same or similar total risk scores.

Referring to FIG. 4B, edges of the subgraph that are shown as dashed arrows represent organizational relations between identity nodes. Specifically, the dashed-arrow edges of the subgraph 401 represent REPORTS_TO relations 426 between identities. For example, identity nodes 410, 414 have a REPORTS_TO relation with identity node 408. Identity nodes 408, 412 have a REPORTS_TO relation with identity node 402. The relations shown in FIG. 4B may represent that the identity node 402 represents a digital identity of a high level manager who manages the digital identities represented by identity nodes 408, 412. Similarly, identity node 408 may represent a digital identity of a mid-level manager who reports to the high level manager represented by identity node 402, and manages the employees represented by identity nodes 410, 414.

At the ranking step 440, each node of the subgraph 401 is assigned an organizational importance factor (e.g., a Page Rank). The organizational importance factor is measured by running a PageRank algorithm over the knowledge graph. For example, identity node 402 is assigned a Page Rank of 0.8, and identity node 408 is assigned a Page Rank of 0.7. The Page Rank of identity node 402 is greater than the Page Rank of identity node 408 due to the identity node 402 representing a digital identity of greater organizational importance compared to the digital identity represented by identity node 408. Similarly, resource node 406 is assigned a Page Rank of 0.9, and resource node 411 is assigned a Page Rank of zero. In some examples, the Page Rank for resources can be based in part on the identities that have relations with the resources. For example, the resource node 406 has a HAS_ENTITLEMENT relation with the identity node 402, which has a high organizational importance. Thus, the resource node 406 has a higher Page Rank than resource node 418, which has a relation with identity node 414, which is of lower organizational importance compared to identity node 402.

The ranking system 242 determines a priority score (e.g., a rank) for the nodes of the subgraph 401. The rank can be determined by multiplying the total risk of a node, determined in step 400, by the page rank of the node. For example, referring to FIG. 4B, the rank of the identity node 402 is determined by multiplying the total risk of seven by the Page Rank of 0.8. The rank of the identity node 402 is therefore 5.6. The rank of the identity node 408 is determined by multiplying the total risk of five by the Page Rank of 0.7. The rank of the identity node 408 is therefore 3.5. The rank of the identity node 412 is determined by multiplying the total risk of seven by the Page Rank of 0.7. The rank of the identity node 412 is therefore 4.9. Thus, although the identity nodes 402, 412 have the same total risk of seven, the identity node 402 has a higher rank of 5.6, compared to the identity node 412 having a rank of 4.9, due to the greater organizational importance of the identity node 402.

The ranking system 242 can determine priority scores (e.g., ranks) for resources in addition to, or instead of, determining priority scores for identities. For example, the rank for resource node 406 can be determined by multiplying the total risk of seven by the Page Rank of 0.9. The rank of resource node 406 is therefore 6.3. The rank for resource node 416 can be determined by multiplying the total risk of seven by the Page Rank of 0.5. The rank of resource node 416 is therefore 3.5. Thus, although the resource nodes 406, 416 have the same total risk of seven, the resource node 402 has a higher rank of 6.3, compared to the resource node 416 having a rank of 3.5, due to the greater organizational importance of the resource node 406.

In some examples, the ranking system 424 prioritizes objects at risk according to the explicit risk over the object, the object's organizational importance, the number of resources that the object has access to, and whether the object is associated to an incompliance resource. Specifically, the ranking system 424 can determine priority scores for objects according to Equation 1:

$$\text{Rank(Identity)}=(\text{DirectRisk(Identity)}*\text{IncomplianceFactor(Identity)}+\text{ResourcesDegree(Identity)})*\text{PageRank(Identity)} \quad \text{Equation 1}$$

In Equation 1, the DirectRisk (Identity) factor is the Explicit risk for the identity. The ResourcesDegree (Identity) factor is the number of entitled applications and the number of workstations that have relations with the identity. The IncomplianceFactor (Identity) is a parameter of 1.25 if the identity is related to incompliant machine. If the identity is not related to an incompliant machine, the IncomplianceFactor (Identity) is 1.0. The PageRank (Identity) factor is the PageRank Score based on organizational connections.

Figures 4C, 4D:
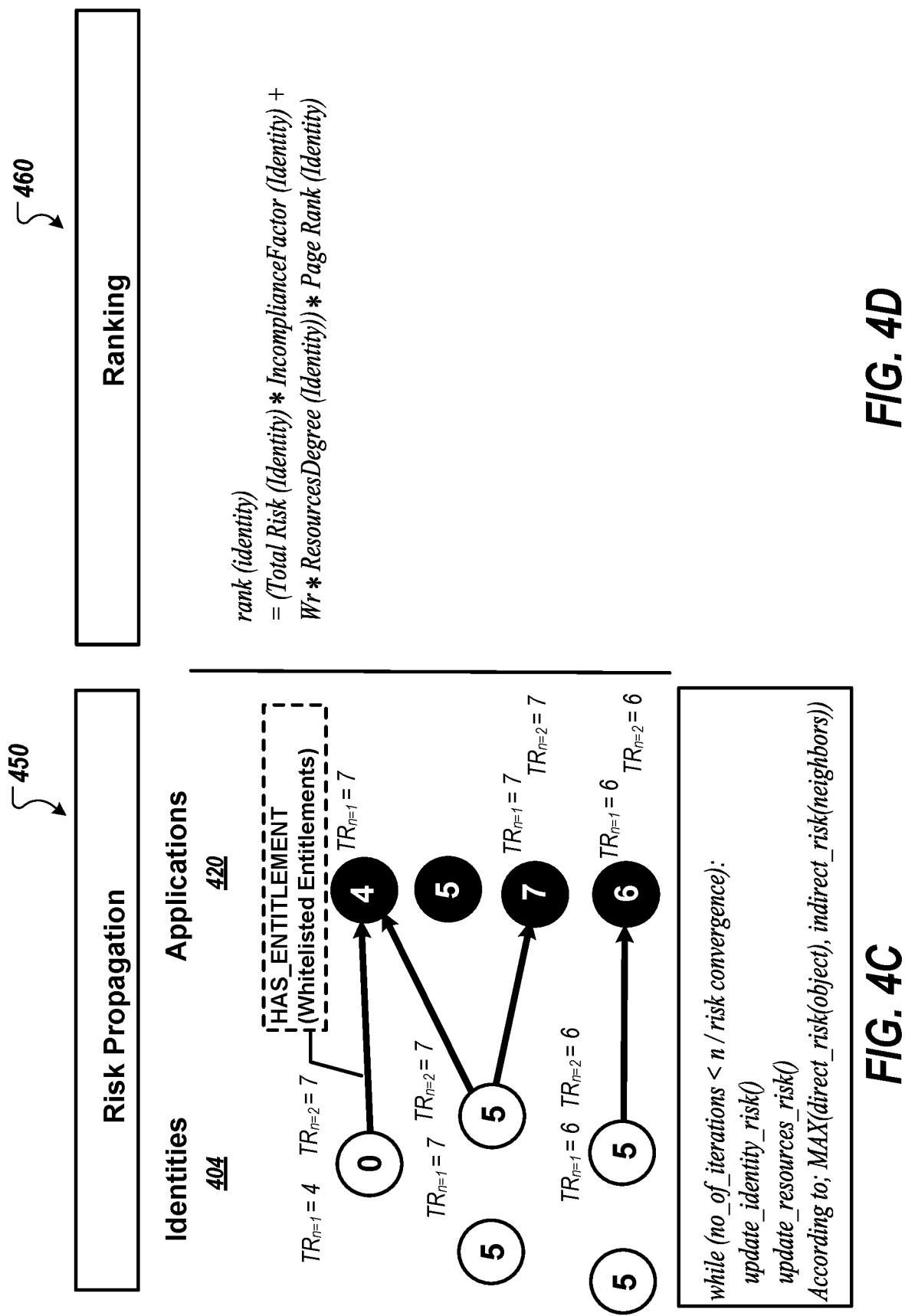

FIGS. 4C and 4D show another example of risk propagation and identity ranking. FIG. 4C illustrates a risk propagation step 450 applied to the subgraph 401. The risk propagation step 450 is the same as the risk propagation step 400 shown in FIG. 4A. At the ranking step 460, rank is calculated for each node based on the total risk, incompliance factor, resource weight (Wr), resource degree, and page rank. The resource degree factor is the number of entitled applications and the number of workstations that have relations with the node. The resource weight is a measure of the amount by which the resource degree influences the risk rank of an identity. The incompliance factor is a parameter of 1.25 if the node is related to incompliant machine. If the node is not related to an incompliant machine, the incompliance factor is 1.0. The page rank factor is the page rank score based on organizational connections.

Table 1 presents an example anomaly detection algorithm. The anomaly detection algorithm can be performed by the anomaly detection system 244. The anomaly detection system 244 can perform statistical calculations to determine personal and global anomaly thresholds, and then compares periodically added risks for different identities against these thresholds to calculate anomaly scores. The anomaly scores can be used to identify unusual behavior that exceeds the thresholds and to differentiate between individual and global anomalies. Global weights and personal weights can be used for anomaly detection. For example, the anomaly detection system 244 can determine whether risk falls within expected standard deviations (std) based on individual and group weights. Parameters such as "global_weight," "personal_weight," and "number_of_stds," can be used used to weight the anomaly scores and control the sensitivity of the anomaly detection algorithm. The global anomaly score can be calculated with regards to all the population, or with regards to pre-defined cohorts (e.g., all administrators of the same system). Overall, the anomaly detection algorithm uses statistical methods to detect potentially problematic behavior in a large dataset of periodically added risks. In some examples, anomaly detection can be performed periodically, such as on a daily basis.

TABLE 1

Anomaly Detection

```
//Initialize parameters
   global_weight = 1, personal_weight = 100, number_of_stds = 1
   // calculate global anomaly threshold; global_periodically_added_explicit_risks
refers to a list of periodically explicit risks across all users throughout history
   global_mean = mean(global_periodically_added_explicit_risks)
   global_std = std(global_periodically_added_explicit_risks)
   global_anomaly_threshold = global_mean + number_of_stds * global_std
   //loop through each identity; identity_periodically_added_explicit_risks refers to a
list of all periodically added risks for a specific identity throughout history
   For each identity in identities:
      If len(risk_nodes_associated_with_identity) >= 10;
         //calculate personal anomaly threshold
         personal_mean = mean(identity_periodically_added_explicit_risks)
         personal_std = std(identity_periodically_added_explicit_risks)
       personal_anomaly_threshold = personal_mean + number_of_stds *
personal_std
         //calculate distance from personal and global thresholds
         distance_from_personal_threshold = today_added_risk -
personal_anomaly_threshold
         distance_from_global_threshold = today_added_risk -
global_anomaly_threshold
         //check if identity exceeds either threshold
         if today_added_risk > personal_anomaly_threshold or today_added_risk >
global)anomaly_threshold:
            //calculate anomaly score
```

TABLE 1-continued

Anomaly Detection

```
        anomaly_score = global_weight * distance_from_global_threshold +
personal_weight * distance_from_personal_threshold
        identity.anomaly_score = anomaly_score
     else
        identity.anomaly_score = 0
  Return: list of identities where identity.anomaly_score>0 sorted by anomaly score
```

Figure 5A:
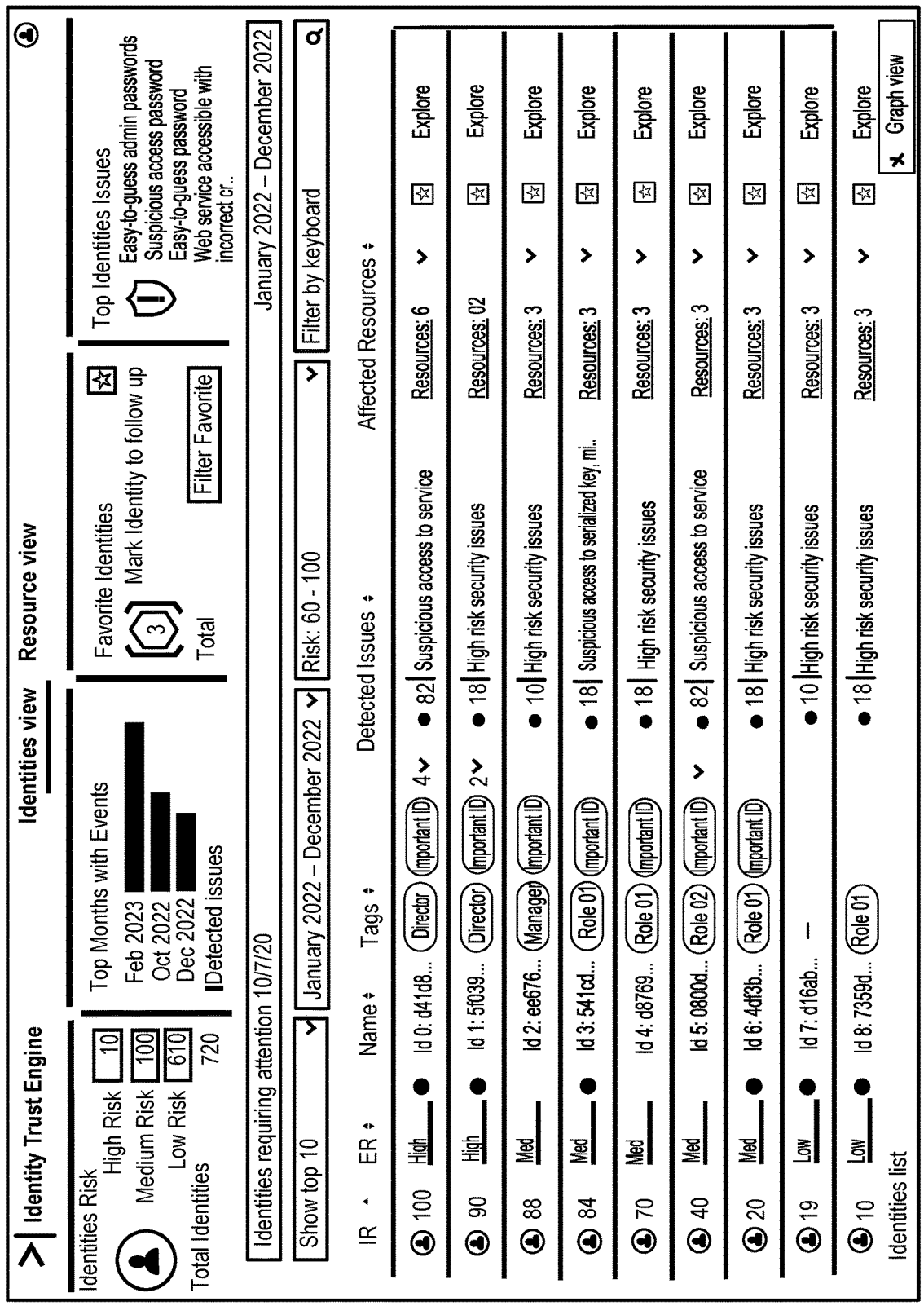
FIG. 5A depicts an example user interface showing rankings of digital identities.
Figure 5B:
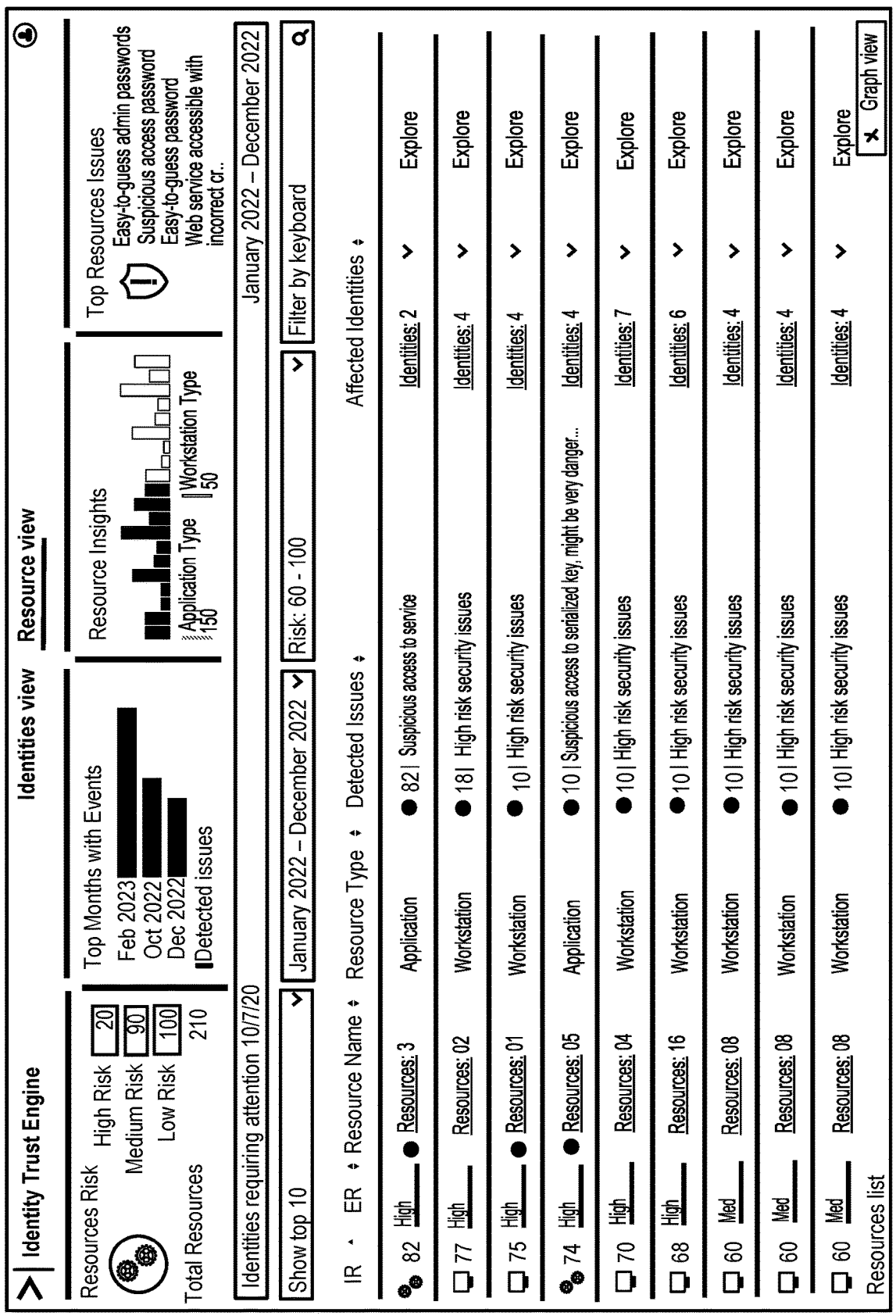
FIG. 5B depicts an example user interface showing rankings of resources.

FIGS. 5A and 5B depict example user interfaces for use cases of implementations of the present disclosure. FIG. 5A shows an identities view 500, while FIG. 5B shows a resource view 550.

Referring to FIG. 5A, in the identities view 500, the user interface presents a list of identities. The identities can be sorted by rank (priority score) and by the size of the anomaly caused by the periodically added risk. In the example presented in FIG. 5A, the identities are sorted to show the identities with the highest values of implicit risk (IR) and explicit risk (ER). The identities view 500 shows, for each identity, an identity name, tags associated with the identity, a number and type of detected issues, and the number of affected resources.

Referring to FIG. 5B, in the resource view 550, the user interface presents a list of resources. The resources can be sorted by priority score. In the example presented in FIG. 5B, the resources are sorted to show the resources with the highest values of IR and ER. The resource view 550 shows, for each resource, a resource name, a resource type, a number and type of detected issues, and the number of affected identities.

Figure 6:
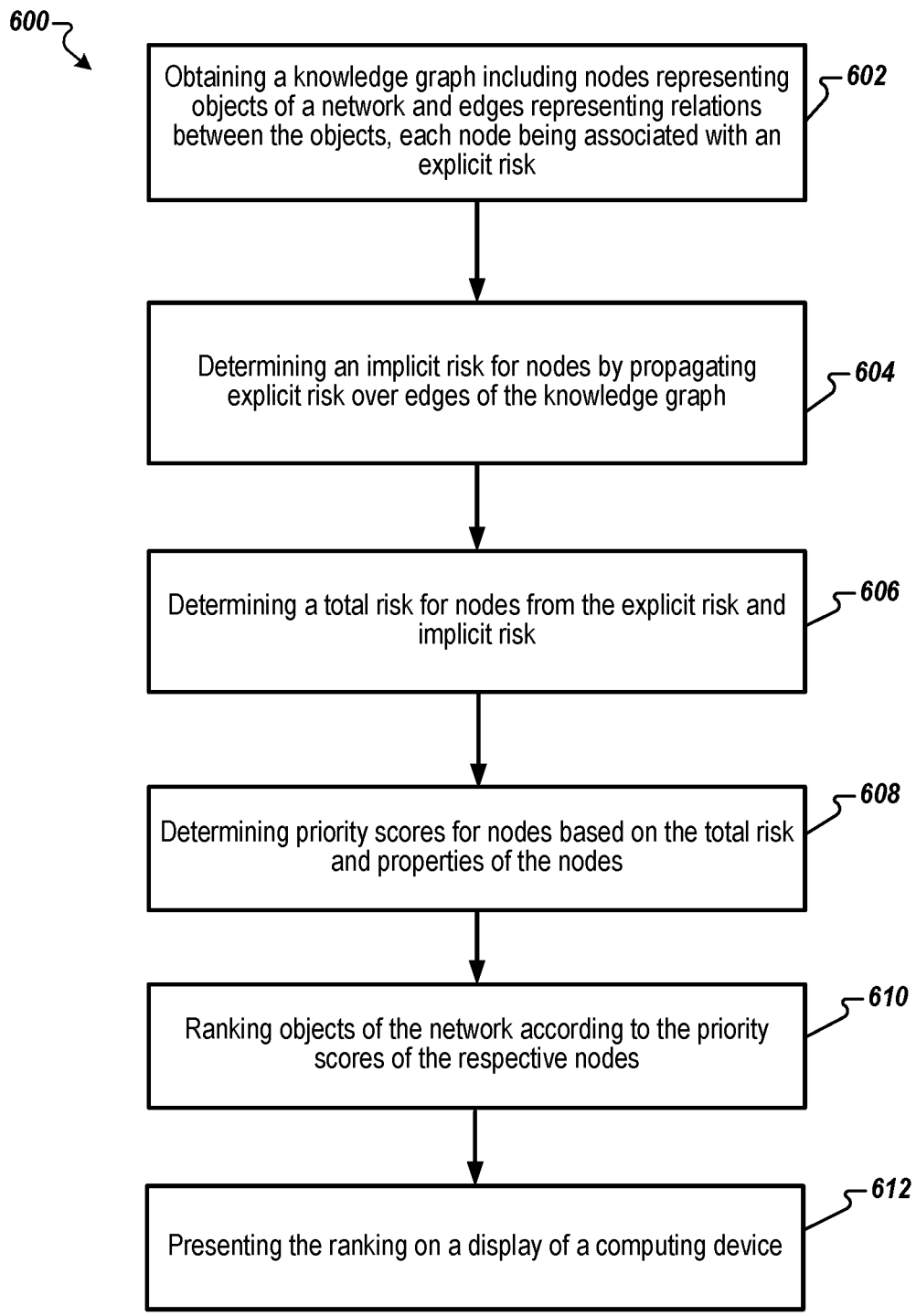
FIG. 6 depicts an example process that can be executed in accordance with implementations of the present disclosure.

FIG. 6 depicts an example process 600 that can be executed in accordance with implementations of the present disclosure. In some implementations, the example process 600 may be performed using one or more computer-executable programs executed using one or more computing devices. The example process 600 can be performed, for example, by the server system 108 of the architecture 100.

A knowledge graph is obtained (602). The knowledge graph includes nodes representing objects of a network and edges representing relations between the objects. The objects can include digital identities and resources. Digital identities can include human identities, non-human identities, or both. For example, digital identities can include cloud identities, service accounts, and local accounts on systems. Resources can include applications and workstations.

Each node is associated with an explicit risk. Explicit risk can be represented by an explicit risk score that represents an expected level of risk for the associated object over a time duration. The time duration can be, for example, several hours, a day, several days.

Each node is associated with one or more properties of the represented object. Properties associated with a node can include an organizational importance factor for the object represented by the node. The organizational importance factor can be determined based on organizational data representing an organizational structure of the enterprise. In some examples, properties associated with a node can include a compliance status of the object represented by the node. In some examples, properties associated with the node can include a number of nodes connected to the node by an edge. Each edge can represent a relation between two nodes. Relations between nodes can include, for example, reports_to, manages, works_with, in_ad_group, has_access, and has_entitlement.

The knowledge graph can be generated from organizational data representing an organizational structure of the enterprise, access data representing accesses of digital identities to resources, and event data representing cybersecurity events that have occurred within the enterprise network. In some examples, access data can include login data representing accesses of digital identities to workstations. In some examples, access data can include entitlement data representing accesses of digital identities to applications.

An implicit risk is determined by propagating explicit risk over edges of the knowledge graph (604). For example, implicit risk can be determined by propagating explicit risk from identities to resources, and from resources to identities, based on the relations between the identities and the resources.

A total risk for nodes is determined from the explicit risk and the implicit risk (606). For example, the total risk can be the maximal of the implicit risk and the explicit risk for a given node. In some examples, total risk is iteratively determined. In each iteration, total risk can be determined first for identities and second for resources.

Priority scores are determined for nodes based on the total risk and properties of the nodes (608). In some examples, priority scores, or ranks, can be determined based at least in part on properties of the nodes determined from contextual information. The contextual information can include, for example, compliance information for objects, a structure of the organization, a number of connected nodes, or any of these.

Objects of the network are ranked according to the priority scores of the respective nodes (610). For example, identities and resources having higher priority scores can be ranking higher than identities and resources having lower priority scores. In some examples, objects can be ranked according to the priority scores and according to an anomaly score indicating a detected risk anomaly.

Cyber security risk data indicating the ranking of the objects of the network is presented on a display of a computing device (612). In some examples, the cyber security risk data includes a list of digital identities and total risk scores for each of the digital identities. In some examples, the cyber security risk data includes a list of resources and total risk scores for each of the resources.

In some examples, the system can select objects of the enterprise network based on the priority scores and can perform actions to mitigate the cyber security risk associated with the selected objects. In some examples, the system presents, through a user interface, a graphical representation of the ranking of the objects and an indication of a mitigation recommendation. In some examples, the system automatically executes actions included in a mitigation recommendation based on the priority ranking of the objects.

In some examples, the system performs automatic actions to mitigate cybersecurity risk based on the ranked list of objects. Automatic actions can include, for example, disabling accounts for digital identities, disabling workstations, revoking entitlements of digital identities to applications, modifying entitlements of digital identities to applications, or any combination of these. In an example, a particular digital identity may be determined to have a high priority score due to a high level of importance and a large number of connected nodes. In response to determining that the particular identity has a high priority score, the system can disable or modify accesses of the particular digital identity to reduce the risk to the network. The system can prioritize the mitigation actions associated with the particular digital identity over mitigation actions associated with another digital identity that has a lower priority score. For example, the system can perform the mitigation actions associated with the particular digital identity before performing mitigation actions associated with the digital identity that has the lower priority score.

In some examples, a mitigation list is generated. The mitigation list can include a prioritized list of elements that can be mitigated to reduce risk. A set of remediation actions can be determined and/or executed. For example, one or more elements of the mitigation list can be mapped to at least one mitigation action. In some examples, an element-to-mitigation action mapping can be retrieved from computer-readable memory, which identifies remediation actions that can be executed for respective elements. Remediation actions can be automatically executed in accordance with the mitigation recommendation. For example, a remediation action can be executed to mitigate risk resulting from a respective element.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for mitigating cyber security risk of an enterprise network, the computer-implemented method being executed by one or more processors and comprising:
    obtaining graph data defining a knowledge graph including nodes and edges between the nodes, the nodes representing respective objects of the enterprise network including digital identities and resources, each node being associated with an explicit risk score and one or more properties of the represented object, each edge representing a relation between objects;
    determining priority scores for the objects of the enterprise network, including, for a first object represented by a first node:
        determining an implicit risk score for the first node by propagating explicit risk scores over edges of the knowledge graph;
        determining a total risk score for the first node from the explicit risk score of the first node and the implicit risk score of the first node; and
        determining a priority score for the first node based on the total risk score and one or more properties associated with the first node;
    generating a ranking of the objects of the enterprise network according to the respective priority scores; and
    providing, for presentation on a display of a computing device, cyber security risk data indicating the ranking of the objects of the enterprise network.

2. The method of claim 1, wherein the cyber security risk data includes a list of digital identities and the total risk scores for each of the digital identities.

3. The method of claim 1, wherein the cyber security risk data includes a list of resources and the total risk scores for each of the resources.

4. The method of claim 1, wherein the digital identities include human identities.

5. The method of claim 1, wherein the digital identities include non-human identities.

6. The method of claim 1, wherein the resources include applications and workstations.

7. The method of claim 1, wherein:
    the first node represents a digital identity;
    a second node represents a resource; and
    an edge between the first node and the second node represents the digital identity having access to the resource.

8. The method of claim 1, wherein:
    the first node represents a first digital identity;
    a second node represents a second digital identity; and
    an edge between the first node and the second node represents that the first digital identity reports to, manages, or works with the second digital identity.

9. The method of claim 1, wherein:
    the first node represents a first digital identity;
    a second node represents a group of digital identities; and
    an edge between the first node and the second node represents that the first digital identity is included in the group of digital identities.

10. The method of claim 1, wherein:
    the first node represents a group of digital identities;
    a second node represents a resource; and
    an edge between the first node and the second node represents the group of digital identities having access to the resource.

11. The method of claim 1, wherein the explicit risk score represents an expected level of risk for the associated object over a time duration.

12. The method of claim 1, comprising generating the knowledge graph from at least one of a group consisting of:
    organizational data representing an organizational structure of the enterprise;
    access data representing accesses of digital identities to resources; and
    event data representing cybersecurity events that have occurred within the enterprise network.

13. The method of claim 12, wherein the access data includes at least one of a group consisting of:
    login data representing accesses of digital identities to workstations; and
    entitlement data representing accesses of digital identities to applications.

14. The method of claim 1, wherein the one or more properties associated with the first node include an organizational importance factor for the object represented by the first node, the organizational importance factor being determined based on organizational data representing an organizational structure of the enterprise.

15. The method of claim 1, wherein the one or more properties associated with the first node include a compliance status of the object represented by the first node.

16. The method of claim 1, wherein the one or more properties associated with the first node include a number of nodes connected to the first node by an edge.

17. The method of claim 1, comprising:
selecting one or more objects of the enterprise network based on the respective priority scores; and
performing one or more actions to mitigate the cyber security risk associated with the selected one or more objects.

18. The method of claim 1, wherein the one or more properties associated with the first node include a historical average total risk score for the first node, the method comprising:
determining a difference between the total risk score and the historical average total risk score for the first node; and
determining the priority score for the first node based at least in part on the difference between the total risk score and the historical average total risk score.

19. One or more non-transitory computer-readable storage media coupled to one or more processors and having instructions stored thereon which, when executed by the one or more processors, cause the one or more processors to perform operations for mitigating cyber security risk of an enterprise network, the operations comprising:
obtaining graph data defining a knowledge graph including nodes and edges between the nodes, the nodes representing respective objects of the enterprise network including digital identities and resources, each node being associated with an explicit risk score and one or more properties of the represented object, each edge representing a relation between objects;
determining priority scores for the objects of the enterprise network, including, for a first object represented by a first node:
determining an implicit risk score for the first node by propagating explicit risk scores over edges of the knowledge graph;
determining a total risk score for the first node from the explicit risk score of the first node and the implicit risk score of the first node; and
determining a priority score for the first node based on the total risk score and one or more properties associated with the first node;
generating a ranking of the objects of the enterprise network according to the respective priority scores; and
providing, for presentation on a display of a computing device, cyber security risk data indicating the ranking of the objects of the enterprise network.

20. A system, comprising:
one or more processors; and
a computer-readable storage device coupled to the one or more processors and having instructions stored thereon which, when executed by the one or more processors, cause the one or more processors to perform operations for mitigating cyber security risk of an enterprise network, the operations comprising:
obtaining graph data defining a knowledge graph including nodes and edges between the nodes, the nodes representing respective objects of the enterprise network including digital identities and resources, each node being associated with an explicit risk score and one or more properties of the represented object, each edge representing a relation between objects;
determining priority scores for the objects of the enterprise network, including, for a first object represented by a first node:
determining an implicit risk score for the first node by propagating explicit risk scores over edges of the knowledge graph;
determining a total risk score for the first node from the explicit risk score of the first node and the implicit risk score of the first node; and
determining a priority score for the first node based on the total risk score and one or more properties associated with the first node;
generating a ranking of the objects of the enterprise network according to the respective priority scores; and
providing, for presentation on a display of a computing device, cyber security risk data indicating the ranking of the objects of the enterprise network.

\* \* \* \* \*